United States Patent
Liu et al.

(10) Patent No.: US 8,436,804 B2
(45) Date of Patent: May 7, 2013

(54) DIGITAL PHOTO FRAME WITH POWER SAVING FUNCTION AND RELATED POWER SAVING METHOD

(75) Inventors: Wei-Lun Liu, Taipei Hsien (TW); Huang-Ping Lu, Taipei Hsien (TW); Jheng-Bin Huang, Taipei Hsien (TW); Hsin-Hui Shih, Taipei Hsien (TW); Wen-Chin Wu, Taipei Hsien (TW); Chia-Hsien Li, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 1211 days.

(21) Appl. No.: 12/186,540

(22) Filed: Aug. 6, 2008

(65) Prior Publication Data
US 2009/0160541 A1  Jun. 25, 2009

(30) Foreign Application Priority Data
Dec. 21, 2007  (TW) ............................. 96149206 A

(51) Int. Cl.
*G09G 3/36* (2006.01)
(52) U.S. Cl.
USPC ............................. 345/102; 345/211; 713/320
(58) Field of Classification Search .............. 345/102, 345/211, 204; 713/300–340
See application file for complete search history.

(56) References Cited

U.S. PATENT DOCUMENTS

| 6,121,962 | A * | 9/2000 | Hwang | 345/211 |
| 6,665,805 | B1 * | 12/2003 | Tsirkel et al. | 713/323 |
| 7,050,037 | B1 * | 5/2006 | Kuramatsu | 345/102 |
| 8,063,869 | B2 * | 11/2011 | Drader et al. | 345/102 |
| 2002/0021288 | A1 * | 2/2002 | Schug | 345/169 |
| 2004/0150678 | A1 * | 8/2004 | Jeong | 345/867 |
| 2005/0174319 | A1 * | 8/2005 | Hwang | 345/102 |
| 2006/0192749 | A1 * | 8/2006 | Lowles et al. | 345/102 |
| 2008/0100632 | A1 * | 5/2008 | Peng | 345/530 |
| 2008/0118152 | A1 * | 5/2008 | Thorn et al. | 382/190 |
| 2008/0165024 | A1 * | 7/2008 | Gretton et al. | 340/825.22 |
| 2008/0165115 | A1 * | 7/2008 | Herz et al. | 345/102 |

FOREIGN PATENT DOCUMENTS

| CN | 101453537 A | 6/2009 |
| TW | 400972 | 8/2000 |
| TW | 200415531 | 8/2004 |

\* cited by examiner

*Primary Examiner* — Hong Zhou
(74) *Attorney, Agent, or Firm* — Winston Hsu; Scott Margo

(57) ABSTRACT

A digital photo frame having power saving functions includes a display panel, a power generation unit for switching a system power according to a power control signal, a user detection unit installed on the display panel for detecting whether a user exists within a specific range to generate a user detection signal, a central processing unit for adjusting backlight intensity of the display panel when the system power is provided by the power generation unit according to the user detection signal and for generating a power switch-off signal when the backlight intensity of the display panel is turned off according to the user detection signal, and a power control unit for generating the power control signal to switch off the system power when the backlight intensity of the display panel is adjusted to be switched off according to the power switch-off signal.

8 Claims, 4 Drawing Sheets

DIGITAL PHOTO FRAME WITH POWER SAVING FUNCTION AND RELATED POWER SAVING METHOD

BACKGROUND OF THE INVENTION

1. Field of the Invention

The present invention relates to a digital photo frame with a power saving function, and more particularly, to a digital photo frame that senses presence of a user within a specific range as a basis of power saving operations.

2. Description of the Prior Art

For an electronic device equipped with a display panel, such as a digital photo frame, a great amount of system power is consumed in operating the display panel. In portable products, which use batteries as a power source, standby time is greatly limited. Thus, power-saving design becomes a very important issue.

Taking a 3.5-inch digital photo frame as an example, typical power consumption of the display panel is roughly between 0.384 and 0.41 Watts, whereas power consumption of the rest of the digital photo frame amounts to only 0.85 Watts. In other words, the display panel consumes about one-third of the total system power. Thus, if power saving measures, such as turning off a backlight of the display panel, can be employed appropriately, e.g. when the display panel is not in use (for example: when the user leaves), the standby time of such portable products can be significantly increased.

Power saving mechanisms in current portable computers and personal computers are mostly based on trigger signals from a keyboard or a mouse, whereas flatscreen TVs typically utilize light sensors to sense surrounding light, and adjust light intensity of their screen accordingly. However, in each of these two methods, the electronic device cannot accurately detect the presence of users when performing the power saving operations. This means the display panels remain in full operation when the user leaves. For example, a digital photo frame may continue displaying pictures on its display panel when the user leaves, which causes unnecessary waste of system power. Therefore, if appropriate sensors can be incorporated for detecting the presence of the user, the power saving operations, such as turning off the backlight of the display panel, can be performed more accurately, such that the standby time of the portable product can be increased significantly.

SUMMARY OF THE INVENTION

It is therefore a primary objective of the present invention to provide a digital photo frame with power saving functions and related power saving methods.

The present invention discloses a digital photo frame with power saving functions, which comprises a display panel, a power generation unit, a user detection unit, a central processing unit and a power control unit. The power generation unit is utilized for providing a system power and switching the system power according to a power control signal. The user detection unit, installed in the display panel, is utilized for detecting presence of a user within a specific range to generate a user detection signal. The central processing unit, coupled to the power generation unit and the user detection unit, is utilized for dimming backlight intensity of the display panel according to the user detection signal when the system power is provided by the power generation unit and for generating a power switch-off signal according to the user detection signal when the backlight intensity of the display panel is dimmed to be off. The power control unit, coupled to the power generation unit and the central processing unit, is utilized for generating the power control signal to control the power generation unit to switch off the system power according to the power switch-off signal when the backlight intensity of the display panel is dimmed to be off.

The present invention further discloses a power saving method for a digital photo frame, which comprises computing a first idle time of the digital photo frame according to a user trigger signal and determining whether the first idle time is greater than a first default value, switching on a user detection unit when the first idle time is greater than the first default value, computing a second idle time of the digital photo frame according to a user detection signal generated by the user detection unit or the user trigger signal and determining whether the second idle time is greater than a second default value, switching off a backlight of a display panel on the digital photo frame when the second idle time is greater than the second default value, computing a third idle time of the digital photo frame according to the user detection signal generated by the user detection unit or the user trigger signal and determining whether the third idle time is greater than a third default value, and switching off a system power of the digital photo frame when the third idle time is greater than the third default value.

The present invention further discloses a power saving method for a digital photo frame, which comprises computing a first idle time of the digital photo frame according to a user trigger signal and determining whether the first idle time is greater than a first default value, switching on a user detection unit and dimming backlight intensity of a display panel of the digital photo frame when the first idle time is greater than the first default value, computing a second idle time of the digital photo frame according to a user detection signal generated by the user detection unit or the user trigger signal and determining whether the second idle time is greater than a second default value, determining whether the backlight intensity of the display panel is dimmed to be off when the second idle time is greater than the second default value, computing a third idle time of the digital photo frame according to the user detection signal generated by the user detection unit or the user trigger signal after the backlight intensity of the display panel is dimmed to be off and determining whether the third idle time is greater than a third default value, and switching off a system power of the digital photo frame when the third idle time is greater than the third default value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
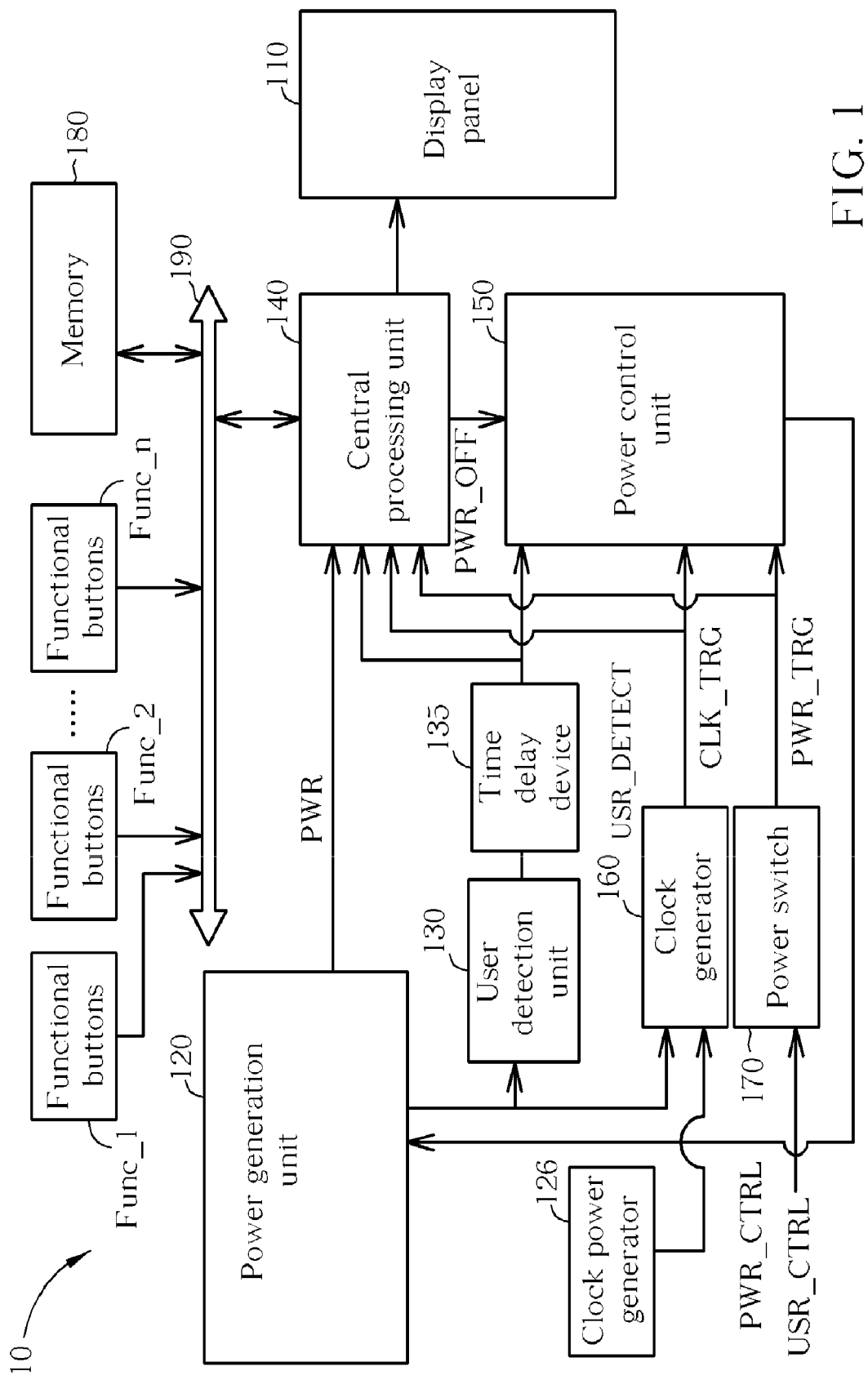
FIG. 1 is a functional block diagram of a digital photo frame according to an embodiment of the present invention.

Please refer to FIG. 1. FIG. 1 is a functional block diagram of a digital photo frame 10 according to an embodiment of the present invention. The digital photo frame 10 comprises a display panel 110, a power generation unit 120, a user detection unit 130, a central processing unit 140 and a power control unit 150. The power generation unit 120 is utilized for providing a system power PWR and switching on or off the system power PWR according to a power control signal PWR_CTRL. The user detection unit 130 is installed on the display panel 110, and is utilized for detecting whether a user exists within a specific range to generate a user detection signal USR_DETECT. The central processing unit 140 is coupled to the user detection unit 130 and the power generation unit 120, and is utilized for dimming backlight intensity of the display panel 110 according to the user detection signal USR_DETECT when the power generation unit 120 provides the system power PWR for the digital photo frame 10, and for generating a power switch-off signal PWR_OFF according to the user detection signal USR_DETECT when the backlight intensity of the display panel 110 is dimmed to be in an off state. The power control unit 150 is coupled to the power generation unit 120, the user detection unit 130, and the central processing unit 140, and is utilized for generating a power control signal PWR_CTRL to control the power generation unit 120 to switch off the system power PWR according to the power switch-off signal PWR_OFF when the backlight intensity of the display panel 110 is dimmed to be in the off state. Preferably, the user detection unit 130 is a passive infrared sensor that detects changes in infrared radiation occurring when there is movement by a person (or object) which is different in temperature from the surroundings to generate the user detection signal USR_DETECT. The user detection unit 130 may further include a time delay device 135, which samples the user detection signal USR_DETECT outputted by the user detection unit 130 once every specific time interval and outputs corresponding sampling results to the central processing unit 140 and the power control unit 150 for preventing abnormal operation of the digital photo frame 10.

Thus, utilizing the user detection unit 130, the digital photo frame 10 of the present invention can detect the existence of users within the specific range to generate the user detection signal USR_DETECT, and thus related power saving operations can be performed more accurately based on the user detection signal USR_DETECT. For example, when system power is normally supplied for the digital photo frame 10, the central processing unit 140 can determine the existence of the users within the sensing range of the user detection unit 130 based on the user detection signal USR_DETECT, so as to adjust the backlight intensity of the display panel 110 accordingly. And, if no users are detected by the user detection unit 130 within the specific range, the central processing unit 140 can further switch off the system power PWR through the power control unit 150 when the backlight intensity of the display panel 110 is adjusted to be off, so as to reduce the power consumption of the digital photo frame 10 and increase the standby time of the digital photo frame 10 as well.

In addition, the digital photo frame 10 may further comprise a clock generator 160, a power switch 170, and a memory 180 as shown in FIG. 1. The clock generator 160 is coupled to the power control unit 150 and the central processing unit 140, and is utilized for generating a clock trigger signal CLK_TRG according to a predetermined time, such as an alarm time preset by the users. The power switch 170 is coupled to the power control unit 150 and the central processing unit 140, and is utilized for generating a power trigger signal PWR_TRG according to a user control signal USR_CTRL. The memory 180 is coupled to the central processing unit 140 through a system bus 190, and is utilized for storing data. Preferably, the digital photo frame 10 may further comprise functional buttons Func_1 to Func_n for generating corresponding trigger events that trigger the central processing unit 140 to execute corresponding functions such as displaying a next picture or deleting pictures when touched by the users. Thus, the power saving operations of the digital photo frame 10, such as adjusting the backlight intensity of the display panel 110 or switching off the system power PWR can further be performed based on the clock trigger signal CLK_TRG, the power trigger signal PWR_TRG, or the trigger events generated by the functional buttons Func_1 to Func_n other than the user detection signal USR_DETECT.

On the other hand, when the system power PWR of the digital photo frame 10 is switched off, the central processing unit 140 is disabled, and only the user detection unit 130, the clock generation unit 160 and the power switch 170 are kept in normal operation in the system. Note that, at this time, the operation power needed by the user detection unit 130 and the clock generator 160 is provided by a rechargeable battery of the power generation unit 120, and in some special cases, such as if the rechargeable battery runs out, the operation power of the clock generator 160 may then be provided by a clock power generator 126 (such as a mercury cell). Thus, even if the system power PWR of the digital photo frame 10 is switched off, the power control unit 150 may still generate the power control signal PWR_CTRL for controlling the power generation unit 120 to switch on the system power PWR again based on the user detection signal USR_DETECT, the clock trigger signal CLK_TRG and the power trigger signal PWR_TRG, so as to resume normal operation of the digital photo frame 10. In other words, if the user detection unit 130 detects the existence of the users within the specific range to generate the user detection signal USR_DETECT, the power switch 170 is switched on by the users to generate the power trigger signal PWR_TRG, or the clock generator 160 generates the clock trigger signal CLK_TRG, according to a predetermined time when the system power PWR of the digital photo frame 10 is switched off. The power control unit 150 may then be triggered to generate the power control signal PWR_CTRL for controlling the power generation unit 120 to switch on the system power PWR again. As for the detailed operation of the digital photo frame 10, please refer to the following description.

Figure 2:
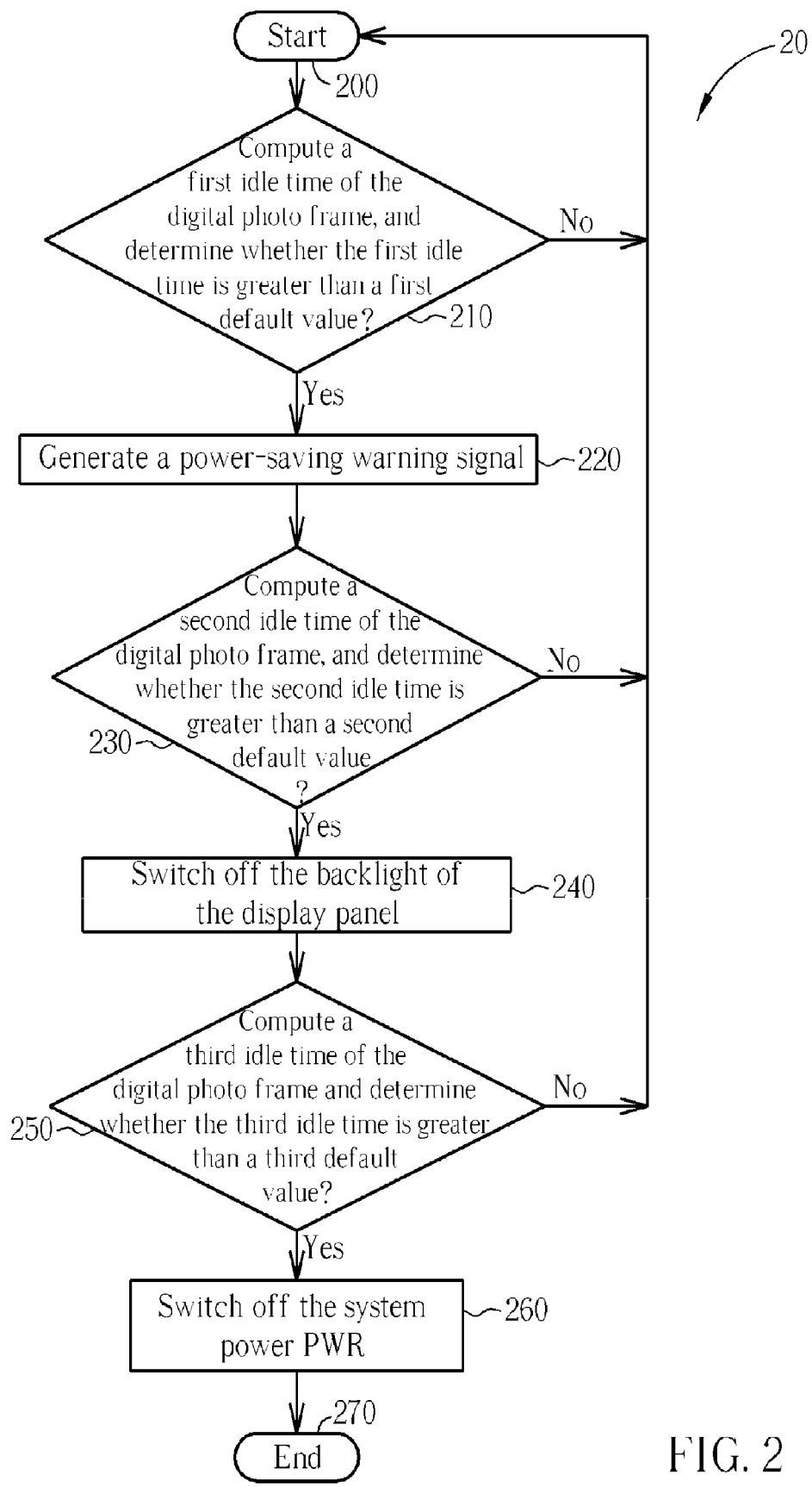
FIG. 2 is a schematic diagram of a power saving process according to a first embodiment of the present invention.

Please refer to FIG. 2. FIG. 2 is a schematic diagram of a power saving process 20 according to a first embodiment of the present invention. The power saving process 20 is utilized for realizing the power saving functions of the digital photo frame 10, and includes the following steps:

Step 200: Start.

Step 210: Compute a first idle time of the digital photo frame 10, and determine whether the first idle time is greater than a first default value. If so, proceed to Step 220; and if not, proceed to Step 200.

Step 220: Generate a power-saving warning signal.

Step 230: Compute a second idle time of the digital photo frame 10, and determine whether the second idle time is greater than a second default value. If so, proceed to Step 240; and if not, proceed to Step 200.

Step 240: Switch off the backlight of the display panel 110.

Step 250: Compute a third idle time of the digital photo frame 10 and determine whether the third idle time is greater than a third default value. If so, proceed to Step 260; and if not, proceed to Step 200.

Step 260: Switch off the system power PWR.

Step 270: End.

According to the power saving process 20, the central processing unit 140 first computes the first idle time of the digital photo frame 10 according to a user trigger signal, and determines whether the first idle time is greater than the first default value (Step 210). The user trigger signal includes the clock trigger signal CLK_TRG, the power trigger signal PWR_TRG, or the trigger events generated by the functional buttons Func_1 to Func_n mentioned above. Thus, if any of the clock trigger signal CLK_TRG, the power trigger signal PWR_TRG, or the trigger events generated by the functional buttons Func_1 to Func_n is received, the central processing unit 140 then stops computing the first idle time and executes the power saving process 20 from the beginning again. Conversely, if the idle time of the digital photo frame 10 is greater than the first default value, the central processing unit 140 then generates a power-saving warning signal (Step 220). Preferably, the power-saving warning signal can be a message displayed on the display panel 110 or a warning signal made up by sounds or lights, and is utilized for reminding users that the digital photo frame 10 has entered a power saving process. Therefore, if the user still wants to view the pictures on the display panel 110, some response, such as touching the functional buttons Func_1 to Func_n may be made by the users to terminate the power saving process 20. The power-saving warning signal prevents sudden turning off of the backlight of the display panel 110 or of the system power PWR due to the power saving operations of the digital photo frame 10, which may make the users feel a bit sudden.

Next, the central processing unit 140 activates the user detection unit 130 to continue computing the idle time of the digital photo frame 10 according to the user detection signal USR_DETECT and the user trigger signal, e.g. the clock trigger signal CLK_TRG, the power trigger signal PWR_TRG or the trigger events generated by the functional buttons Func_1 to Func_n. If the second idle time of the digital photo frame 10 is greater than the second default value, the central processing unit 140 then turns off the backlight of the display panel 110 to make the digital photo frame 10 enter a first power saving mode (Step 240); conversely, if any of the user detection signal USR_DETECT, the clock trigger signal CLK_TRG, the power trigger signal PWR_TRG or the trigger events generated by the functional buttons Func_1 to Func_n is detected when the second idle time has not reached the second default value, the central processing unit 140 then executes corresponding trigger events, such as resuming display of the pictures, performing alarm functions, or accessing the memory 180 through the system bus 190, and simultaneously switches off the user detection unit 130 to re-enter the power saving process 20 from the beginning. This means, when the idle time of the digital photo frame 10 exceeds the sum of the first default value and the second default value, i.e. none of the user detection signal USR_DETECT, the clock trigger signal CLK_TRG, the power trigger signal PWR_TRG or the trigger events generated by the functional buttons Func_1 to Func_n is received, the central processing unit 140 can switch off the backlight of the display panel 110 to reduce system power consumption.

Then, the central processing unit 140 starts to compute the third idle time of the digital photo frame 10 and determines whether the third idle time is greater than the third default value (Step 250). Similarly, the central processing unit 140 computes the third idle time according to the user detection signal USR_DETECT, the clock trigger signal CLK_TRG, the power trigger signal PWR_TRG or the trigger events generated by the functional buttons Func_1 to Func_n. If the third idle time is greater than the third default value, the central processing unit 140 generates the power control signal PWR_CTRL through the power control unit 150 for controlling the power generation unit 120 to switch off the system power PWR (Step 260). Conversely, if any of the user detection signal USR_DETECT, the clock trigger signal CLK_TRG, the power trigger signal PWR_TRG or the trigger events generated by the functional buttons Func_1 to Func_n is detected by the central processing unit 140 when the third idle time has not reached the third default value, the central processing unit 140 then switches off the user detection unit 130 to re-enter the power saving process 20 from the beginning, and simultaneously executes corresponding trigger events such as resuming picture display operation, performing alarm functions, etc.

This means, when the idle time of the digital photo frame 10 exceeds the sum of the first default value, the second default value and the third default value, i.e. none of the user detection signal USR_DETECT, the clock trigger signal CLK_TRG, the power trigger signal PWR_TRG or the trigger events generated by the functional buttons Func_1 to Func_n is detected, the central processing unit 140 controls the power control unit 120 to generate the power control signal PWR_CTRL for switching off the system power PWR and enters into a second power saving mode.

On the other hand, when the system power PWR of the digital photo frame 10 is switched off, the central processing unit 140 is disabled, and only the user detection unit 130, the clock generation unit 160 and the power switch 170 are kept in normal operation by the rechargeable battery of the power generation unit 120 in the system. At this time, if any of the user detection signal USR_DETECT, the clock trigger signal CLK_TRG, or the power trigger signal PWR_TRG is generated, the power control unit 150 may then be triggered to generate the power control signal PWR_CTRL for controlling the power generation unit 120 to switch on the system power PWR again, thereby resuming the normal operation of the digital photo frame 10. This means that the digital photo frame 10 can be awakened to execute corresponding trigger events, such as resuming picture display or performing the alarm functions, only if the user detection unit 130 detects the existence of the users within the specific range, the power switch 170 is switched on by the users, or the clock generator 160 generates the clock trigger signal CLK_TRG according to a predetermined time. Certainly, when the digital photo frame 10 is awakened to execute the corresponding trigger events, the power saving process 20 may be executed from the beginning again.

Therefore, the digital photo frame 10 of the present invention can perform the power saving operations, such as turning off the backlight intensity of the display panel 110 or switching off system power, by detecting the existence of the users within the specific range, so as to reduce the power consumption of the digital photo frame 10. In this case, not only may the standby time of the display panel 110 be increased, but the accuracy of the power saving operations may also be enhanced. Note that the power saving process 20 is merely an exemplary illustration of the present invention, but not a limitation, and those skilled in the art can certainly make appropriate modifications according to practical demands. For example, other than turning off the backlight of the display panel 110 in the first power saving mode, variations such as lowering an operating clock of the entire system may also be adopted, which belongs to the range of the present invention as well.

Figure 3:
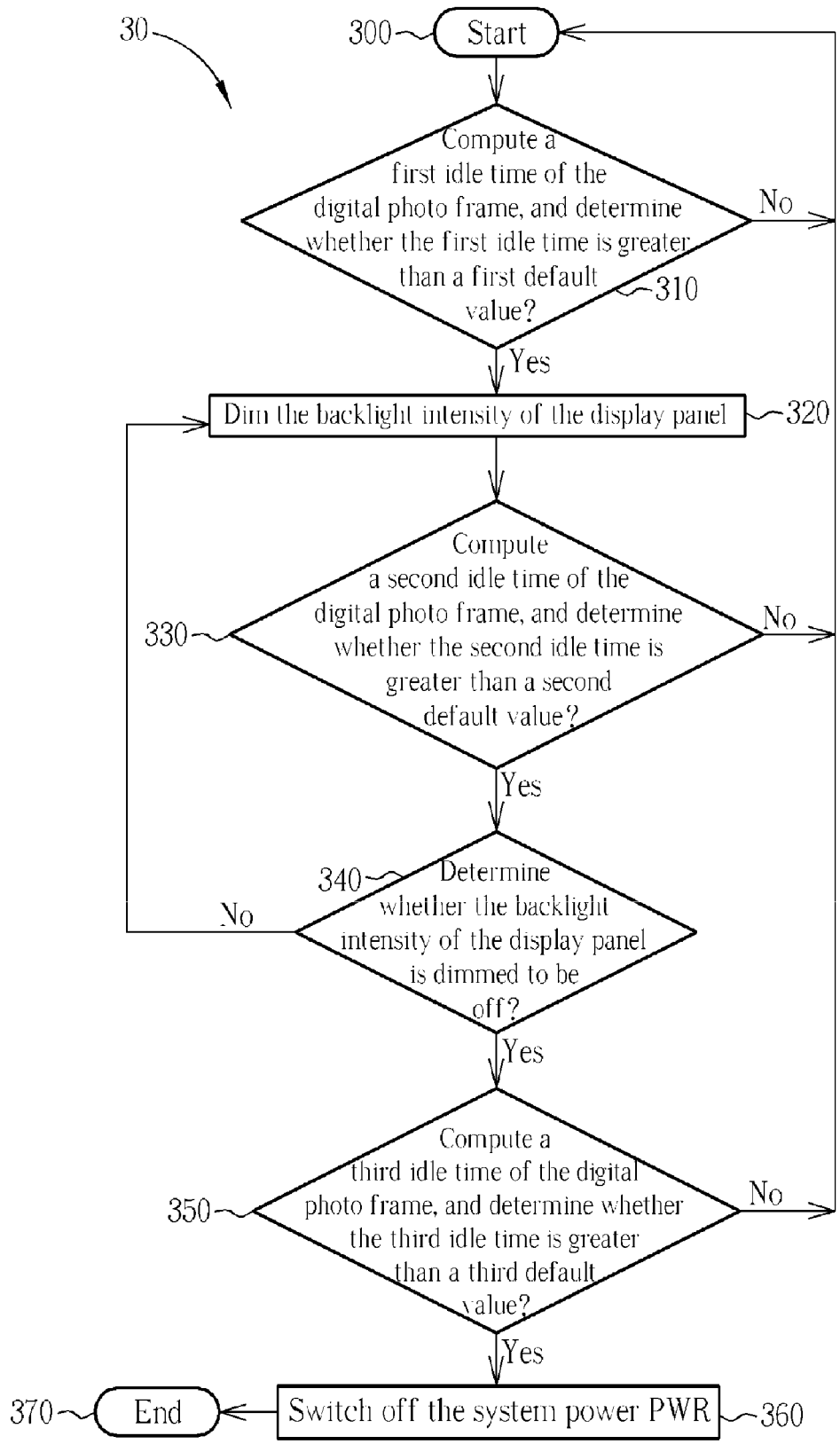
FIG. 3 is a schematic diagram of a power saving process according to a second embodiment of the present invention.

Please continue to refer to FIG. 3. FIG. 3 is a schematic diagram of a power saving process 30 according to a second embodiment of the present invention. The power saving process 30 is utilized for realizing the power saving functions of the digital photo frame 10, and includes the following steps:

Step 300: Start.

Step 310: Compute a first idle time of the digital photo frame 10, and determine whether the first idle time is greater than a first default value. If so, proceed to Step 320; and if not, proceed to Step 300.

Step 320: Dim the backlight intensity of the display panel 110.

Step 330: Compute a second idle time of the digital photo frame 10, and determine whether the second idle time is greater than a second default value. If so, proceed to Step 340; and if not, proceed to Step 300.

Step 340: Determine whether the backlight intensity of the display panel 110 is dimmed to be off. If so, proceed to Step 350; and if not, proceed to Step 320.

Step 350: Compute a third idle time of the digital photo frame 10, and determine whether the third idle time is greater than a third default value. If so, proceed to Step 360; and if not, proceed to Step 300.

Step 360: Switch off the system power PWR.

Step 370: End.

According to the power saving process 30, the central processing unit 140 first computes the first idle time of the digital photo frame 10 according to a user trigger signal, and determines whether the first idle time is greater than the first default value (Step 310). The user trigger signal may include the clock trigger signal CLK_TRG, the power trigger signal PWR_TRG, or the trigger events generated by the functional buttons Func_1 to Func_n mentioned above. If none of the clock trigger signal CLK_TRG, the power trigger signal PWR_TRG, or the trigger events generated by the functional buttons Func_1 to Func_n is received when the idle time of the digital photo frame 10 is greater than the first default value, the central processing unit 140 then begins to adjust the backlight intensity of the display panel 110 to save system power (Step 320).

Then, the central processing unit 140 activates the user detection unit 130 for carrying on computation of the second idle time of the digital photo frame 10 according to the user detection signal USR_DETECT and the user trigger signal (Step 330). If any of the user detection signal USR_DETECT, the clock trigger signal CLK_TRG, the power trigger signal PWR_TRG, or the trigger events generated by the functional buttons Func_1 to Func_n is received, the central processing unit 140 then restores the backlight intensity of the display panel 110 for executing corresponding trigger events, such as resuming the picture display, performing alarm functions, or accessing the memory 180 through the system bus 190, and simultaneously switches off the user detection unit 130 to re-enter the power saving process 30.

Conversely, if the idle time of the digital photo frame 10 exceeds the sum of the first default value and the second default value, the central processing unit 140 then determines whether the backlight intensity is dimmed to be darkest, i.e. an off state (Step 340). If the backlight of the display panel 110 is dimmed to be off, the central processing unit 140 then computes the third idle time of the digital photo frame 10 (Step 350), and switches off the system power PWR when the third idle time is greater than the third default value (Step 360). On the contrary, if the backlight intensity of the display panel 110 has not been adjusted to be off, the central processing unit 140 repeats execution of Step 320 to Step 340 for dimming the backlight intensity of the display panel 110 stage-by-stage until the backlight of the display panel 110 is adjusted to be off, or any of the user detection signal USR_DETECT, the clock trigger signal CLK_TRG, the power trigger signal PWR_TRG, or the trigger events generated by the functional buttons Func_1 to Func_n is received.

Therefore, compared with the power saving process 20, the backlight intensity of the display panel 110 may be dimmed stage-by-stage, thereby enhancing flexibility of use significantly. Note that the default values of the present invention are not restricted to specific values, but can be adjusted according to practical demands appropriately.

Figure 4:
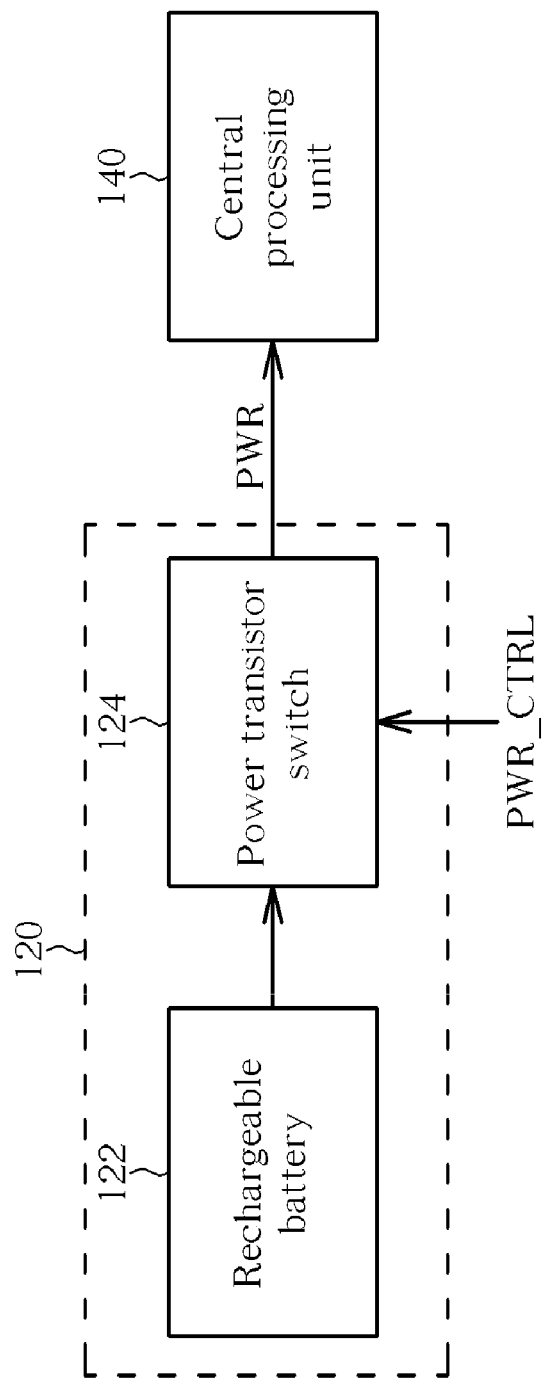
FIG. 4 is a schematic diagram of an embodiment of the power generation unit in FIG. 1.

In addition, the digital photo frame 10 of the present invention can be realized by any hardware or firmware, and all belongs to the range of the present invention as long as the same function is included. For example, please refer to FIG. 4. FIG. 4 is a schematic diagram of an embodiment of the power generation unit 120 in FIG. 1. The power generation unit 120 includes a rechargeable battery 122 and a power transistor switch 124. The power transistor switch 124 is utilized for controlling electrical coupling between the rechargeable battery 122 and the central processing unit 140 to switch the system power PWR on or off according to the power control signal PWR_CTRL. Similarly, the user detection unit 130 can also be realized by a photo-resistor that senses variation of light, or by an ultrasonic sensor that detects the existence of the users by reflection of acoustic waves.

As mentioned above, by sensing the existence of the users within the specific range, the digital photo frame of the present invention can perform power saving operations, such as dimming the backlight intensity of the display panel or switching off the system power, accordingly. Therefore, not only may the standby time of the digital photo frame be enhanced, but the accuracy of the power saving operations may also be increased.

Those skilled in the art will readily observe that numerous modifications and alterations of the device and method may be made while retaining the teachings of the invention.

What is claimed is:

1. A method of saving power for a digital photo frame, the method comprising:

computing a first idle time of the digital photo frame according to a user trigger signal and determining whether the first idle time is greater than a first default value;

switching on a passive infrared sensor when the first idle time is greater than the first default value, wherein the passive infrared sensor detects whether a user exists within a specific range by detecting changes in infrared radiation occurring when there is movement by the user whose temperature is different from surroundings of the digital photo frame, to generate a user detection signal;

computing a second idle time of the digital photo frame according to the user detection signal indicating that the user is not within the specific range or the user trigger signal and determining whether the second idle time is greater than a second default value;

switching off a backlight of a display panel on the digital photo frame when the second idle time is greater than the second default value;

computing a third idle time of the digital photo frame according to the user detection signal indicating that the user is not within the specific range or the user trigger signal and determining whether the third idle time is greater than a third default value; and switching off a system power of the digital photo frame when the third idle time is greater than the third default value.

2. The method of claim 1 further comprising:
generating a power-saving warning signal for reminding users that the digital photo frame has entered a power saving process when the first idle time is greater than the first default value.

3. The method of claim 2 further comprising:
switching on the system power of the digital photo frame and the backlight of the display panel again and switching off the passive infrared sensor according to the user detection signal generated by the passive infrared sensor or the user trigger signal after the system power of the digital photo frame is switched off.

4. The method of claim 3, wherein the user trigger signal comprises:
 a clock trigger signal generated by a clock generator according to a predetermined time;
 a power trigger signal generated by a power switch; and
 a plurality of functional button trigger signals respectively generated by a plurality of functional buttons.

5. A method of saving power for a digital photo frame, the method comprising:
computing a first idle time of the digital photo frame according to a user trigger signal and determining whether the first idle time is greater than a first default value;
switching on a passive infrared sensor and dimming backlight intensity of a display panel of the digital photo frame when the first idle time is greater than the first default value, wherein the passive infrared sensor detects whether a user exists within a specific range by detecting changes in infrared radiation occurring when there is movement by the user whose temperature is different from surroundings of the digital photo frame, to generate a user detection signal;
computing a second idle time of the digital photo frame according to the user detection signal indicating that the user is not within the specific range or the user trigger signal and determining whether the second idle time is greater than a second default value;
determining whether the backlight intensity of the display panel is dimmed to be off when the second idle time is greater than the second default value;
computing a third idle time of the digital photo frame according to the user detection signal indicating that the user is not within the specific range or the user trigger signal after the backlight intensity of the display panel is dimmed to be off and determining whether the third idle time is greater than a third default value; and
switching off a system power of the digital photo frame when the third idle time is greater than the third default value.

6. The method of claim 5 further comprising:
dimming the backlight intensity of the display panel again when the backlight of the display panel is not yet dimmed to be off.

7. The method of claim 6 further comprising:
switching on the system power of the digital photo frame and the backlight of the display panel again and switching off the passive infrared sensor according to the user detection signal generated by the passive infrared sensor or the user trigger signal after the system power of the digital photo frame is switched off.

8. The method of claim 7, wherein the user trigger signal comprises:
 a clock trigger signal generated by a clock generator according to a predetermined time;
 a power trigger signal generated by a power switch; and
 a plurality of functional button trigger signals respectively generated by a plurality of functional buttons.

* * * * *